United States Patent [19]

Romberg

[11] Patent Number: 4,586,944
[45] Date of Patent: May 6, 1986

[54] METHOD OF MANUFACTURING HOLLOW GLASS OBJECTS, AND APPARATUS FOR CARRYING OUT THE METHOD

[75] Inventor: Hendrik Romberg, Eindhoven, Netherlands

[73] Assignee: U.S. Philips Corporation, New York, N.Y.

[21] Appl. No.: 662,862

[22] Filed: Oct. 19, 1984

[30] Foreign Application Priority Data

Oct. 26, 1983 [NL] Netherlands ............... 8303686

[51] Int. Cl.⁴ .................................................. C03B 9/38
[52] U.S. Cl. ............................................. 65/79; 65/110; 65/230; 65/242; 65/283
[58] Field of Search ................. 65/77, 78, 79, 110, 65/230, 242, 283, 267, 229

[56] References Cited

U.S. PATENT DOCUMENTS

| | | | |
|---|---|---|---|
| 1,972,717 | 9/1934 | Schutz | 65/242 X |
| 2,273,777 | 2/1942 | Berthold | 65/77 X |
| 2,688,823 | 9/1954 | Weber | 65/75 |
| 2,928,214 | 3/1960 | Mumford | 65/356 X |
| 3,184,297 | 5/1965 | Zonneveld | 65/78 |
| 3,792,988 | 2/1974 | Nowak et al. | 65/79 |
| 3,888,647 | 6/1975 | Breeden et al. | 65/29 |
| 4,067,711 | 1/1978 | Jones | 65/267 |
| 4,251,253 | 2/1981 | Becker et al. | 65/319 X |
| 4,273,568 | 6/1981 | Scholl et al. | 65/76 |
| 4,276,073 | 6/1981 | Northup | 65/77 |
| 4,283,215 | 8/1981 | Sherman | 65/79 |
| 4,506,185 | 3/1985 | Giller et al. | 313/113 |

FOREIGN PATENT DOCUMENTS

078665 5/1983 European Pat. Off. ............. 65/267

Primary Examiner—Arthur Kellogg
Attorney, Agent, or Firm—David R. Treacy

[57] ABSTRACT

A method and an apparatus for manufacturing hollow glass objects according to the press-and-blow process, in which a glass gob is shaped in a cooled preform mould into an elongate parison, the parison, while freely hanging at its neck portion, is then subjected to a thermal intermediate treatment and subsequently the parison is blown up in a finish mould to the desired hollow glass object and is simultaneously subjected to an upsetting operation, in such a manner that the blown-up hollow glass object at the part having larger transverse dimensions has a considerable wall thickness.

10 Claims, 15 Drawing Figures

METHOD OF MANUFACTURING HOLLOW GLASS OBJECTS, AND APPARATUS FOR CARRYING OUT THE METHOD

The invention relates to a method of manufacturing hollow glass objects by means of the press-and-blow process, in which a glass gob is shaped in a preform mould into an elongate parison, the parison is then removed from the preform mould and is subjected, whilst freely hanging at its open neck portion, to a thermal intermediate treatment and to an intermediate blowing operation, after which the parison is blown up in a finish mould to the desired glass object, wherein the parison, after being removed from the preform mould, is subjected at its bottom part to an upsetting operation and a given wall thickness distribution is obtained in the ultimately formed hollow glass object.

Such a method is known from U.S. Pat. No. 3,184,297. This known method is more particularly intended to manufacture products having a comparatively large diameter viariation, for example bulbs for electrical incandescent lamps having a narrow neck and having a maximum diameter which is equal to three to four times the smallest diameter, the wall thickness of the product being substantially equal throughout its area. However, in these products the wall portions of larger diameter are spherical and the transitions between the wall portions of different diameters vary gradually and with a comparatively large radius of curvature. For the manufacture of products having an abrupt diameter variation and a comparatively small radius of curvature at the transitional parts between the wall portions of different diameters, this known method is less suitable because at the transitional parts having a small radius of curvature an insufficient wall thickness is obtained.

The present invention has for its object to provide a method which makes it possible to manufacture hollow glass objects having a comparatively large and abrupt diameter variation and a comparatively small radius of curvature at the transitional parts between the wall portions of different diameters, wherein also at the transitional parts at least a sufficient, if not the maximum wall thickness is obtained.

According to the invention, this is mainly achieved in that the parison is cooled in the preform mould, that the parison is heated and cooled, respectively, by the thermal treatment and that the upsetting operation at the bottom part of the parison is effected during blowing-up, in such a manner that in the parison a temperature distribution is obtained with a temperature increasing from the neck portion to the bottom part and that in the blown-up hollow glass object a wall thickness distribution is obtained with a considerable wall thickness at the wall portion having the largest transverse dimension.

Ample tests have shown that due to the said combined steps glass objects with the said geometry that can be manufactured only with difficulty can now be manufactured in an economical and reproducible manner with a wall thickness distribution which is not equal throughout the area, it is true, but which has at the mechanically most vulnerable parts, more particularly at the abrupt transitional parts with a comparatively small radius of curvature, a wall thickness which has a considerable to maximum value. The term "comparatively small radius of curvature" is to be understood to mean a radius of the order of 5 mm with a maximum diameter of the hollow glass object of about 100 mm and with an average wall thickness of approximately 2 mm. The method according to the invention is particularly suitable for the manufacture of objects in which a transitional part with an abrupt diameter variation and a small radius of curvature also has the largest diameter.

According to a preferred embodiment of the method in accordance with the invention by means of the thermal intermediate treatment of the parison the upper part is cooled and the lower part is heated. The parison moulded in the preform mould has already obtained at the upper part its ultimate shape and partly also its ultimate wall thickness, while the remaining part of the parison is preformed with a given wall thickness distribution. When now the upper part of the parison is cooled, the parison is prevented from sagging excessively at this part; the lower part of the parison, which has to be blown up in the finish mould to larger transverse dimensions, is slightly cooled during moulding in the preform mould; when now the lower part of the parison is reheated, this loss of heat is compensated for.

Another preferred embodiment of the method according to the invention is characterized in that the parison is caused to sag to a length which is larger than the axial dimension of the glass object to be manufactured and that during blowing-up of the parison the lower part of the parison hanging out of the finish mould open on the lower side is pushed due to the upsetting operation. gradually upwards and into the finish mould.

When the parison is caused to sag to a comparatively large length, a constriction is formed on the upper part of the parison, as a result of which the parison at this constricted part does not get into contact with the wall of the finish mould when the latter is closed; thus, it is possible to manufacture objects with a comparatively narrow neck in a reproducible and disturbance-free manner. During blowing up, the parison is blown up to larger transverse dimensions: when now due to the said step the parison is simultaneously pushed upwards, the increase of the transverse dimensions is connected with a decrease of the length of the parison and an upsetting effect is exerted on the expanding parts, as a result of which a reduction of the wall thickness that would otherwise take place is avoided or can even be overcompensated. Due to the said steps, the parison can be blown up to the ultimate objected in a controlled manner.

It should be noted that it is already known per se from the already mentioned U.S. Pat. No. 3,184,297 to cause the parison to sag to a comparatively large length and to subject the parison to an upsetting operation. However, in this known method, the parison is periodically pushed upwards and upset before the finish mould is closed; now there is a risk that the upper part of the upset parison obtains a diameter which is larger than the relevant diameter of the moulding cavity of the finish mould so that glass can get between the two halves of the finish mould when the latter is closed. Since the operation of upsetting the parison takes place before blowing up in the finish mould, the reduction of the wall thickness connected with the blowing-up cannot be compensated for.

A hollow glass object manufactured by means of the method according to the invention with a narrow neck, with strong and abrupt diameter variations and with a comparatively small radius of curvature at the transitional parts between two wall portions of different diameters is characterized by a considerable wall thickness at the transitional parts.

By means of the method according to the invention, more particularly hollow glass objects can be manufactured which have a transitional part which has besides an abrupt diameter variation and a small radius of curvature also the maximum diameter, for example bulbs for reflector lamps of the type as described in U.K. Patent Application No. 2.097.997. An embodiment of such a bulb is particularly characterized by an annular window which is at right angles or substantially at right angles to the bulbs.

The invention further relates to an apparatus for carrying out the method comprising a neck mould composed of two symmetrical radially displaceable neck mould halves, a preform mould cooperating with a moulding die and a finish mould consisting of two symmetrical finish mould halves and of a disk-shaped bottom part, the preform mould, the moulding die and the finish mould with the bottom part being provided with cooling ducts. Such an apparatus is known from U.S. Pat. No. 4,251,253.

According to the invention, this apparatus is characterized in that the preform mould comprises a mould holder, an insert with a moulding cavity and a mould bottom, whilst the outer circumference of the insert is provided with axially extending cooling fins which enclose together with the inner wall of the mould holder cooling ducts, the cooling fins having at least over part of their length a height decreasing towards the mould bottom. Due to the variable height of the cooling fins, the heat dissipation of the insert, which is effected partly by heat conduction via the mould holder and partly by heat transfer to the cooling air flowing through the cooling ducts, can be influenced so that in the insert, viewed in axial direction, and during moulding also over the length of the parison a given temperature profiled is obtained, i.e. a temperature increasing towards the mould bottom.

It should be noted that in the aforementioned known apparatus measures have been taken to obtain a temperature variation in the circumferential direction of the preform mould and of the parison; however, these measures are not effective when a temperature difference in the longitudinal direction of the preform mould and of the parison should be obtained.

A preform mould having an insert which is provided with axially extending cooling fins is known per se from U.S. Pat. No. 4,067,711. However, the cooling fins are not in direct contact with the outer wall of the moulding cavity, the latter being provided in a separate mould.

Furthermore, it is known per se from U.S. Pat. No. 2,928,214 to produce in a preform mould and in the glass parison present therein a temperature variation in axial direction by means of cooling air openings, the number of which varies, viewed in the longitudinal direction of the preform mould. However, the number of openings increases towards the mould bottom so that the temperature decreases towards the mould bottom.

In a preferred embodiment of the apparatus according to the invention, the insert and the mould holder are made of different materials, the material of the insert having a higher expansion coefficient than the material of the mould holder. Due to this measure, it is achieved that during moulding owing to the stronger expansion of the insert an intimate contact of the cooling fins on the insert with the inner wall of the mould holder is obtained, as a result of which a satisfactory heat transfer is guaranteed and the reproducibility of the process is influenced positively.

A further preferred embodiment of the apparatus according to the invention is characterized by a thermal head, which is displaceable in vertical direction and which comprises an annular cooling head and a burner which are relatively adjustable. By means of the thermal head, the parison can be subjected to a thermal intermediate treatment, in which the parison at one part can be cooled at one part and can be simultaneously heated at another part. By displacement of the thermal head in the direction of height and by adjustment of the cooling head and the burner with respect to each other, the temperature variation over the length of the parison can be further influenced.

Another preferred embodiment of the apparatus according to the invention is characterized in that with the finish mould closed in the circumferential direction, in which the two finish mould halves engage each other, the disk-shaped bottom part can be displaced in the direction of height independently of the two finish mould halves. At the instant at which the process of blowing up the parison begins, the two finish mould halves are closed and constitute together with the bottom part, which is in the lowermost position, an open moulding cavity. During blowing up of the parison, the bottom part is displaced upwards and the parison is then pushed upwards until the moulding cavity is closed.

The invention will be described more fully with reference to the drawing. In the drawing.

Figure 1A:
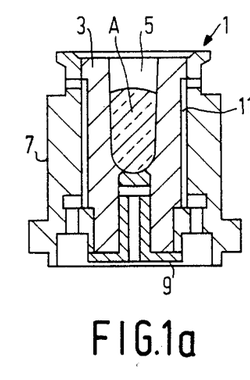
FIGS. 1a to 1j show diagrammatically the successive stages in the manufacture of a hollow glass object by means of the method according to the invention.
Figure 1B:
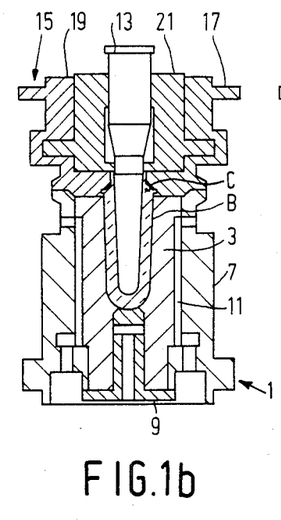

The method according to the invention will be described more fully with reference to FIGS. 1a to 1j. FIG. 1a shows a preform mould 1 comprising a glass gob A, which is sheared in usual manner by means of glass shears from a flow of molten glass flowing out of the outlet opening of a feeder and reached in free fall the preform mould 1. The preform mould 1 to be described further and displaceable in vertical direction mainly consists of an insert 3 which has a moulding cavity 5 and is accommodated in a mould holder 7. The moulding cavity 5 is closed on the bottom side by a mould bottom 9. Between the outer circumference of the insert 3 and the inner circumference of the mould holder 7, the preform mould 1 is provided with cooling ducts 11. At the following processing stages, the glass gob A is moulded according to the blow-moulding process to a hollow glass object having large and abrupt diameter differences, more particularly a bulb for a reflector lamp. FIG. 1b shows the moulding stage, at which the preform mould is situated in the moulding position and at which the glass gob A is moulded by means of a vertically displaceable moulding die 13 to an elongate parison B; at this stage, the neck part C is already brought into its ultimate shape and in part also to the desired wall thickness by means of a neck mould 15 comprising two symmetrical radially displaceable neck mould halves 17 and 19. The neck mould 15 cooperates with the upper side of the preform mould 1. A guiding sleeve 21 serves for guiding the moulding die 13. At this stage, such a temperature variation is produced in the parison B in its longitudinal direction that the temperature of the parison increases towards the bottom. At the following processing stage, the parison B is brought into the successive positions with its neck part C freely hanging at the closed neck mould 15, which is displaceable in a horizontal plane.

Figure 1C:
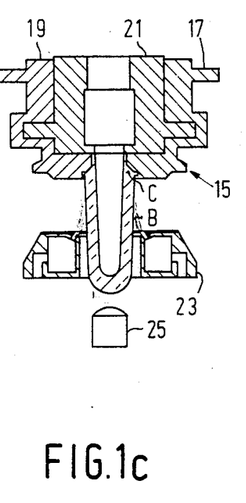
Figure 1D:
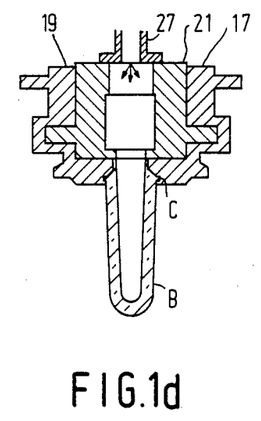
Figure 1E:
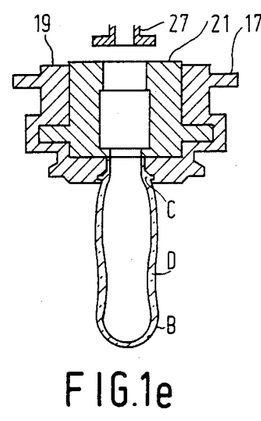

FIG. 1c shows the parison in an intermediate position in which the parison B freely hanging at the neck mould 15 slightly sags and is simultaneously subjected to a thermal intermediate treatment. By means of cooling air supplied via an annular cooling head 23, the upper part of the parison B is cooled, whilst the bottom part is heated by means of a burner 25. Due to this measure, the bottom part is prevented from sagging excessively, while the bottom part, which has been slightly cooled in the preform mould, is heated again at such a temperature that the desired temperature distribution along the parison is maintained. FIGS. 1d and 1e show at a following processing stage the so-called puffing or intermediate blowing, in which a few times in succession air is supplied at a light pressure via an air inlet 27 in order to slightly blow up at least in part the freely hanging still further sagging parison B. FIG. 1d shows the parison at the beginning stage of this processing step, while FIG. 1e shows the end stage; the further sagged slightly blown-up parison B now has a constriction D. As to the wall thickness distribution and the shaping of the parison B, reference is also made to FIG. 5, which shows on an enlarged scale the parison and the final product obtained.

Figure 1F:
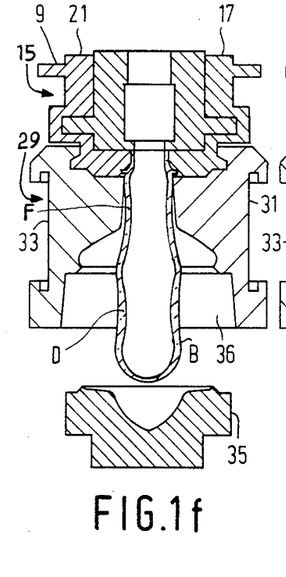
Figure 1G:
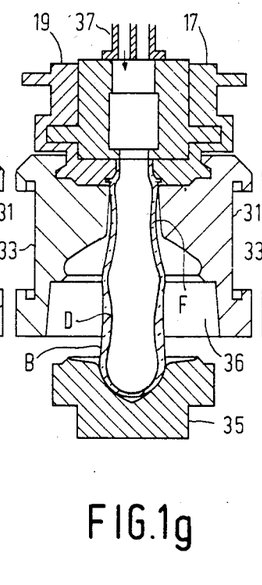
Figure 1H:
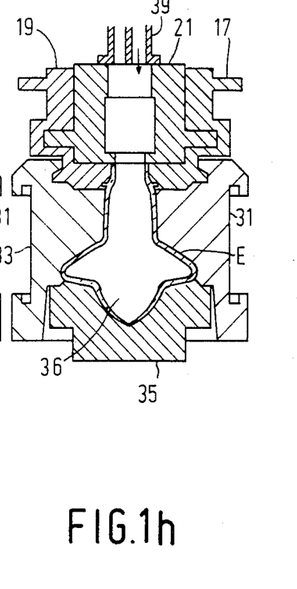

Subsequently, the parison is brought into a blowing position shown in FIGS. 1f, a 1g and 1h, in which the parison is blown up to the final product. For this purpose, the neck mould 15 cooperates with the upper side of a finish mould 29 consisting of two radially displaceable finish mould halves 31 and 33 and a disk-shaped bottom part 35 displaceable in the direction of height. FIG. 1f shows the beginning stage of this processing step at which the two finish mould halves 31 and 33 brought into a position to engage each other enclose the further sagged freely hanging parison at a meanwhile constricted part F of its length and constitute together with the bottom part 35, which is in the lowermost position at a certain distance from the finish mould halves, an open moulding cavity 36 in which the parison can sag further and can develop further to a length exceeding by far the axial dimension of the final product. FIG. 1g shows a first blowing stage at which the bottom part 35 is first brought into contact with the lower end of the parison B and then is moved upwards at a constant speed, whilst via a supply duct 37 air is continuously supplied at a low pressure to the interior of the parison so that the latter is blown up to larger transverse dimensions. At this stage, an increase of the transverse dimensions of the parison is accompanied with a decreasing volume of the moulding cavity and a decreasing length of the parison. The lower end of the parison is pushed upwards into the moulding space and is lightly folded, the first constricted part D being located in the region of the largest diameter.

FIG. 1h shows a second blowing stage at which the bottom part 35 engages the lower side of the two finish mould halves 31 and 33 so that the moulding cavity is closed also on the lower side. At this stage, via a further supply duct 39 air is supplied at an elevated pressure in order to solidify the ultimately formed hollow glass object E in the shape defined by the moulding cavity.

Figure 1I:
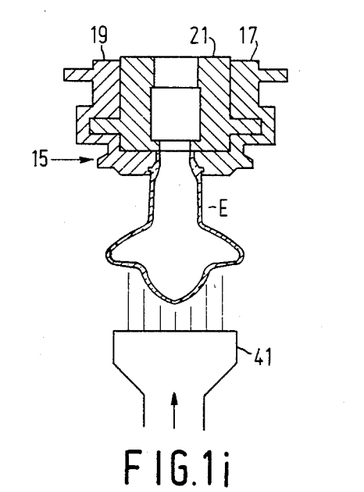
Figure 1J:
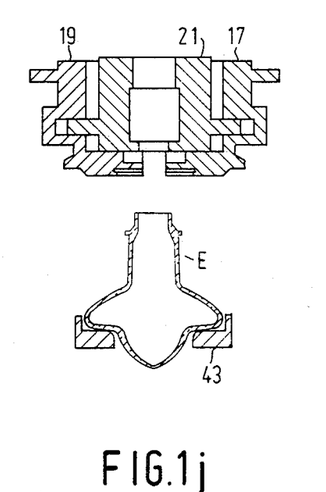

FIG. 1i shows a following position in which the object E freely hanging at the neck mould 15 is subjected to the action of a current of cooling air which is supplied via a blowing nozzle 41. FIG. 1j shows a last position in which the two neck mould halves 17 and 19 are removed from each other in radial direction and in which the released object E can be transported further by means of a carrier 43. As to the wall thickness distribution in the final product, reference is made to the righthand half of FIG. 5, in which the product is shown on an enlarged scale and from which can be seen clearly that at the part which is mechanically most vulnerable, i.e. at the wall portion of the largest diameter, which, viewed in cross-section, passes via a comparatively small radius of curvature abruptly into a part of a smaller diameter, the product has a wall thickness which is considerably larger than the minimum wall thickness at the bottom part of the product.

Figure 2:
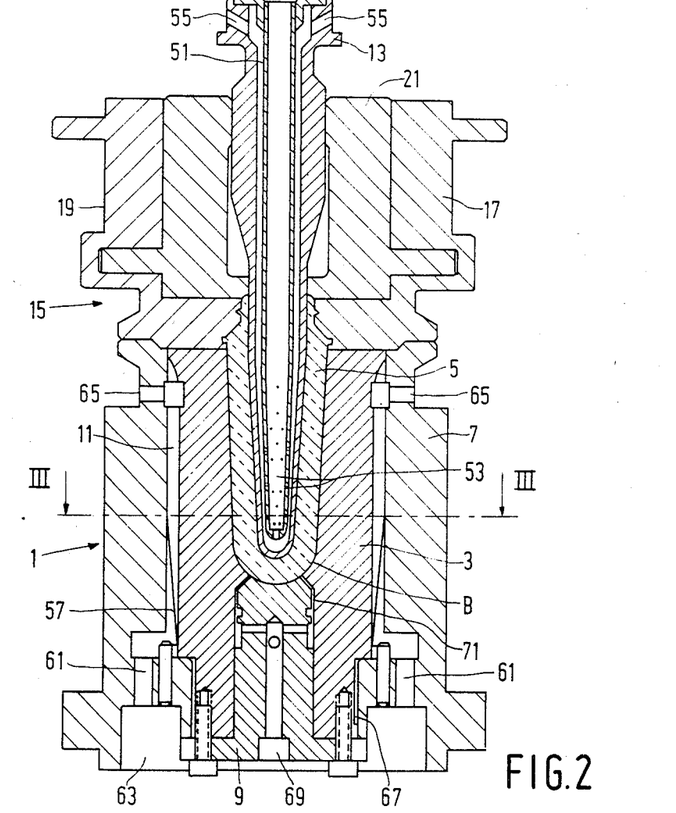
FIG. 2 shows a part of the apparatus according to the invention in longitudinal sectional view.
Figure 3:
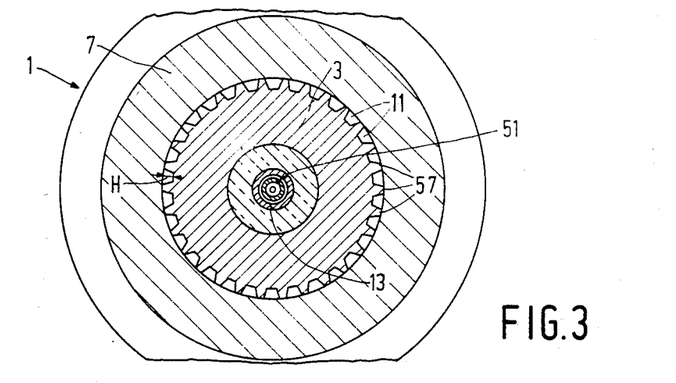
FIG. 3 shows the apparatus of FIG. 2 in cross-sectional view taken on the line III—III in FIG. 2.

Component parts of the apparatus according to the invention will be described more fully with reference to FIGS. 2 to 6. FIGS. 2 and 3 show in longitudinal sectional view and in cross-sectional view, respectively, taken on the line III—III in FIG. 2 the closed preform mould 1 with the insert 3, the cylindrical mould holder 7, the mould bottom 9, the moulding die 13 and the neck mould 15 comprising the two symmetrical neck mould halves 17 and 19 and the annular guiding sleeve 21. The moulding die 13 is in the usual manner of hollow construction and is provided with a cooling pipe 51 through which cooling air is supplied, which is blown through openings 53 against the inner wall of the moulding die and which leaves the moulding die through ducts 55. At the outer circumference of the insert 3, longitudinally extending cooling fins 57 are provided, which over part of their length are in contact with the inner wall of the mould holder 7 and have at the remaining part a height H decreasing towards the mould bottom. The cooling fins 57 enclose together with the outer circumference of the insert 3 and the inner circumference of the mould holder 7 the already mentioned cooling ducts 11, which are connected via connection ducts 61 to an annular duct 63. Cooling air is supplied via the annular duct 63 and the connection ducts 61, flows through the cooling ducts 11 and along the cooling fins 57 and leaves the mould holder 7 via openings 65. The effect of the cooling fins 57, which have over part of their length a decreasing height H, has been set out above already. As an additional step for influencing the cooling, an annular gap 67 is provided between the lower side of the insert 3 and the inner circumference of the mould holder 7. Depending upon the desired heat dissipation, the relevant parts of the insert 3 and of the mould holder 7 may be constructed either so as to engage each other entirely or so as to engage each other in part by means of ribs. A de-aeration duct 69 in the mould bottom 9, which is in communication with an annular gap 71 between the mould bottom and the insert, assists in providing any de-aeration of the moulding cavity when it is filled with glass and an aeration of the moulding cavity when the moulded parison is released. The annular gap 71 has a gap width of approximately 0.2 mm. The insert 3 and the mould holder 7 are made of different materials having different heat expansion coefficients. The mould holder 7 is preferably made of steel having a heat expansion coefficient $\alpha$ of $11.10^{-6}$, while the insert is made of an Al-Cu alloy having a heat expansion coefficient $\alpha$ of $18.10^{-6}$. Due to the higher degree of expansion of the insert 3, during moulding an intimate contact of the cooling fins 57 with the inner wall of the mould holder 7 and a satisfactory heat transfer are obtained, as a result of which a stationary heat dissipation of the heat of the insert 3 and a satisfactory cooling of the preform mould are guaranteed. The said combination of materials moreover offers the advantage of a separation of functions: the steel mould holder provides the mechanical strength of the preform mould, while the insert made of an Al-Cu alloy guarantees a satisfactory cooling. The Al-Cu alloy moreover has a higher resistance to corrosion than steel.

Figure 4:
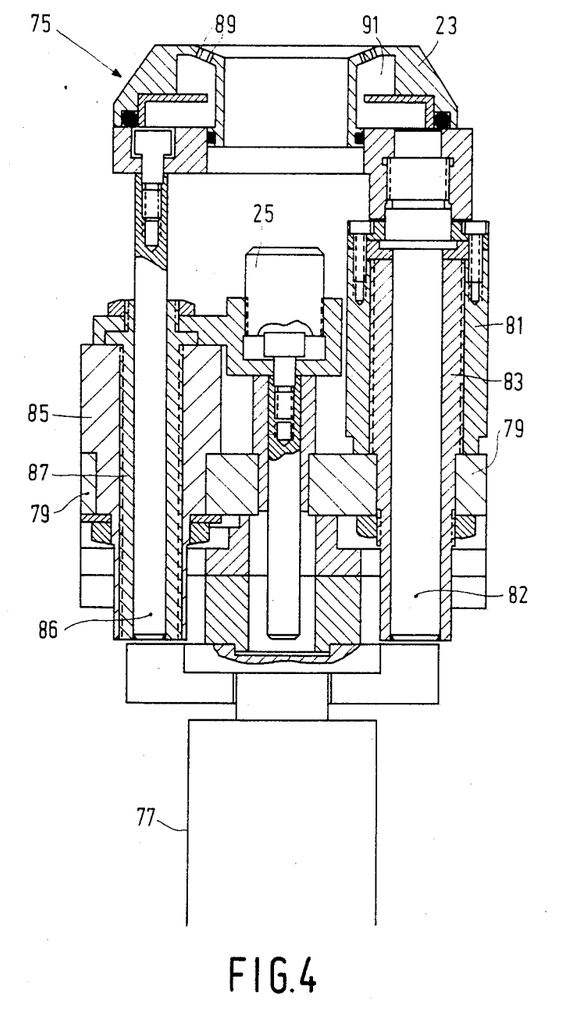
FIG. 4 shows another part of the apparatus in longitudinal sectional view.

FIG. 4 is a longitudinal sectional view of a thermal head 75 comprising the aforementioned annular cooling head 23 and the centrally arranged burner 25. By means of a pneumatic unit 77 and via a driving block 79, the thermal head can be displaced in the direction of height. The cooling head 23 is adjustable in the direction of height by means of a nut 81, which is rotatably journalled on a guide 82 and is displaceable in the axial direction together with this guide. An inner spindle 83 is fixedly secured to the carrier plate 79. The adjustment of the height of the cooling head 23 is effected by means of rotation of the nut 81, as a result of which the inner spindle 83 is displaced. The burned head 25 is displaceable in the axial direction together with an inner spindle 87 on a guide 86. The inner spindle 87 cooperates with a nut 85 which is rotatably journalled in the carrier plate 79. The axial adjustment of the burner head 25 is effected by rotation of the nut 85, as a result of which the inner spindle 87 is displaced in the axial direction together with the burner head 25. The burner 25 may be of a conventional type. The cooling head 23 is provided with air ducts 89, which are in communication with an annular air-supply chamber 91. The cooling air for the cooling head and the gas for the burner are supplied through hoses (not shown).

Figure 5:
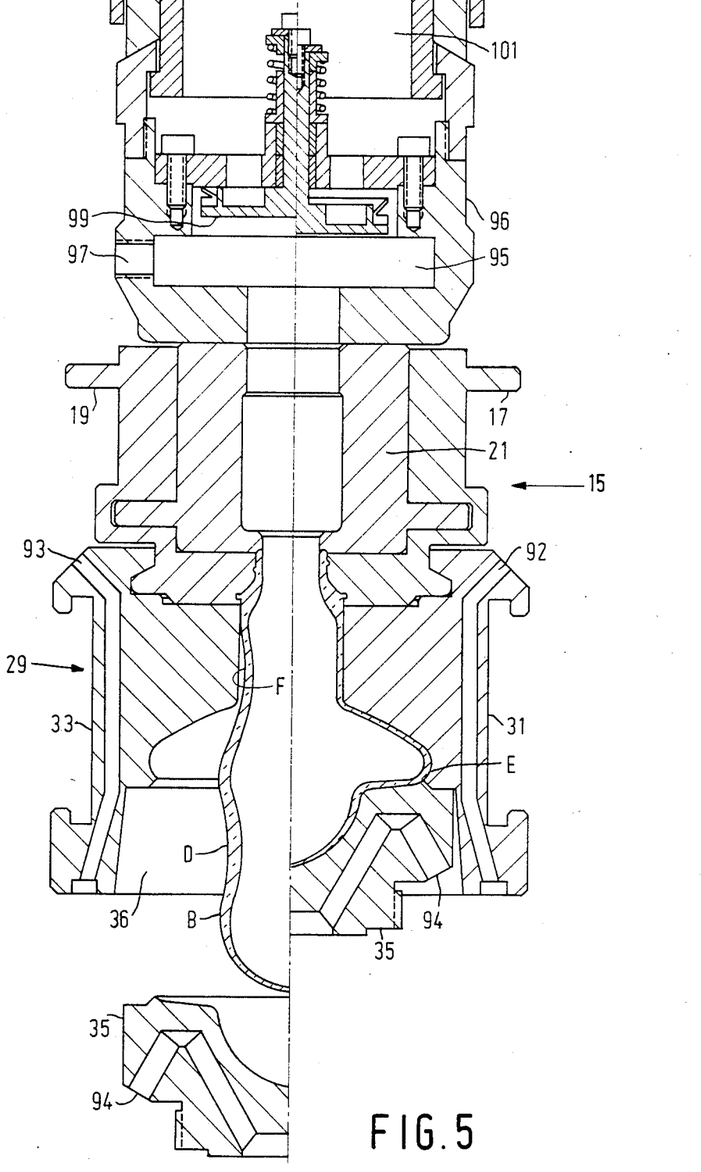
FIG. 5 shows in longitudinal sectional view a further part of the apparatus in two different positions.

FIG. 5 shows the finish mould 29 in longitudinal sectional view, of which the lefthand half illustrates the situation at the beginning stage of the blowing cycle according to FIG. 1f and the righthand half illustrates the situation at the end stage of the blowing cycle according to FIG. 1h. The finish mould 29 comprises the two radially displaceable symmetrical finish mould halves 31 and 33 and the bottom part 35, which parts enclose the the moulding cavity 36 and are provided with cooling ducts 92, 93 and 94, respectively. The two neck mould halves 17 and 19 of the neck mould 15 are locked with the upper side of the two finish mould halves 31 and 33. A blowing head 96 is arranged against the guiding sleeve 21. The blowing head 96 has an air-supply chamber 95, which is in communication via the guiding sleeve 21 with the moulding cavity 36 and with the interior of the parison B, respectively, and which is provided with an opening 97 for the supply of blowing air. The blowing head further comprises a backpressure valve 99, which is arranged between the air-supply chamber 95 and a supply duct 101.

At the first blowing stage, as already described above with reference to FIG. 1g, air is supplied at a low pressure and in a continuous flow via the opening 97 to the air-supply chamber 95, the bottom part 35 being pushed upwards at a constant speed from the position shown in the lefthand half until it gets into contact with the lower side of the two finish mould halves 31 and 33 and the moulding cavity 36 is closed on the lower side. During the subsequent second blowing stage, which has been described above with reference to FIG. 1h and of which the righthand half of FIG. 5 illustrates the end stage, the required blowing air is supplied at an elevated pressure via the supply duct 101 and the backpressure valve 99.

Figure 6:
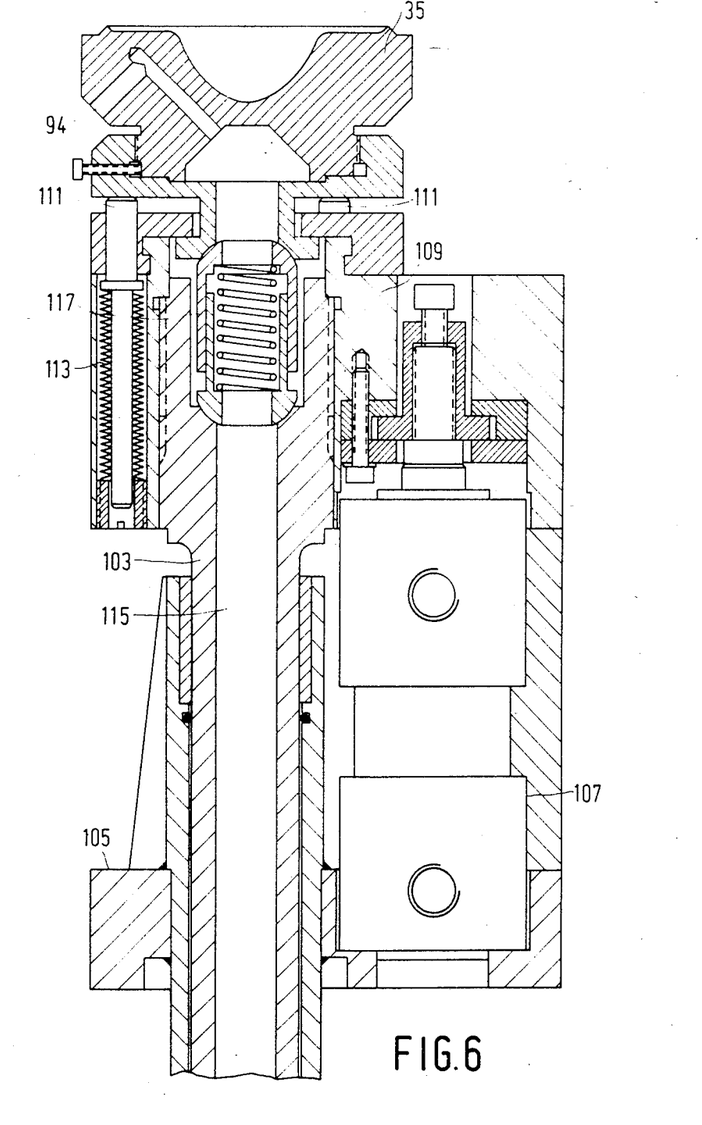
FIG. 6 shows a part of the apparatus of FIG. 5 likewise in longitudinal sectional view.

FIG. 6 is a longitudinal sectional view of the bottom part 35, which is carried by a rod 103, which is displaceable in a frame 105. By means of a pneumatic unit 107 and via a sliding block 109, the bottom part 35 is displaceable in the direction of height. Due to the fact that the bottom part 35 bears on pins 111 which are acted upon together by springs 113, a resilient non-rigid support of the bottom part is obtained. Due to the resilient support of the bottom part 35, positioning errors of the finish mould 29 on the one hand and of the bottom part 35 on the other hand both in the axial and in the radial direction as well as angular errors can be compensated for. The cooling ducts 94 receive cooling air via a cooling-air lead 115 in the rod 103, which lead is in communication with the cooling ducts 94 in the bottom part by means of a resilient coupling 117.

The invention has been described with reference to an embodiment which relates to the manufacture of a hollow glass object having a rotation-symmetrical shape. However, in general the invention is suitable to be used for the manufacture of objects with large and abrupt differences in transverse dimensions, more particularly of products having a narrow neck and also of products which do not exhibit a rotation-symmetrical geometry.

What is claimed is:

1. A method of manufacturing hollow glass objects by the press-and-blow process, comprising the steps of shaping a glass gob into an elongate parison in a preform mold; removing the parison from the preform mold and then subjecting the parison, while the parison is freely hanging by its open neck portion, to a thermal intermediate treatment and to an intermediate blowing operation; and then blowing the parison in a finish mold to form the desired glass object; and including the step, after removal of the parison from the preform mold, of subjecting the parison to an upsetting operation at its bottom part so as to obtain an given wall thickness distribution in the ultimately formed object, characterized by comprising the steps of cooling the parison in the preform mold, heating and then cooling the parison during said thermal intermediate treatment, and performing said upsetting operation during the blowing step, such that a temperature distribution is obtained in the parison with the temperature increasing from the neck portion to the bottom part, and that in the blown hollow object a wall thickness distribution is obtained having a considerable wall thickness at the wall portion having the largest transverse dimension.

2. A method as claimed in claim 1, characterized in that said thermal intermediate treatment comprises cooling the upper part and heating the lower part of the parison.

3. A method as claimed in claim 2, characterized in that while hanging by its open neck portion the parison is caused to sag to a length greater than the axial dimension of the glass object to be manufactured, and the finish mold is open on the lower side, such that the lower part of the parison hangs out of the finish mold and, during blowing of the parison, said roller part is pushed gradually upwards by said upsetting operation, into the finish mold.

4. A method as claimed in claim 1, characterized in that while hanging by its open neck portion the parison is caused to sag to a length greater than the axial dimension of the glass object to be manufactured, and the finish mold is open on the lower side, such that the lower part of the parison hangs out of the finish mold and, during blowing of the parison, said roller part is pushed gradually upwards by said upsetting operation, into the finish mold.

5. An apparatus for manufacturing a hollow glass object by the press-and-blow process, so as to provide an object having a considerable wall thickness at a wall portion having the largest transverse dimension, comprising a neck mold composed of two symmetrical radially displaceable neck mold halves; a preform mold cooperating with a molding die; a finish mold consisting of two symmetrical finish mold halves and a disc-shaped bottom part; and cooling ducts provided in said preform mold, molding die and finish mold, characterized in that said preform mold comprises a mold holder, an insert with a molding cavity and a mold bottom, and axially extending cooling fins provided about the outer circumference of the insert, said fins together with the inner wall of the mold holder enclosing cooling ducts, said cooling fins having, over at least part of their length, a height decreasing toward the mold bottom.

6. An apparatus as claimed in claim 5, characterized in that the insert and the mold holder are made of different materials, the material comprising the insert having a higher expansion coefficient than the material of the mold holder.

7. An apparatus as claimed in claim 6, characterized by comprising a thermal head, arranged to be displaceable in a vertical direction, said head including an annular cooling head and a burner which are adjustable relative to each other.

8. An apparatus as claimed in claim 7, characterized by comprising means for displacing the disc-shaped bottom part in the height direction, independently of the two finish mold halves, when the finish mold is closed circumferentially, and that the two finish mold halves engage each other when the finish mold is closed circumferentially.

9. An apparatus as claimed in claim 5, characterized by comprising means for displacing the disc-shaped bottom part in the height direction, independently of the two finish mold halves, when the finish mold is closed circumferentially, and that the two finish mold halves engage each other when the finish mold is closed circumferentially.

10. An apparatus as claimed in claim 5, characterized by comprising a thermal head, arranged to be displaceable in a vertical direction, said head including an annular cooling head and a burner which are adjustable relative to each other.

* * * * *